United States Patent Office 2,764,593
Patented Sept. 25, 1956

2,764,593

TRIETHYLAMINE SALT OF N-(2-THIAZOYL)-DITHIOCARBAMIC ACID

Guy H. Harris, Concord, and Bryant C. Fischback, Walnut Creek, Calif., assignors to The Dow Chemical Company, Midland, Mich., a corporation of Delaware No Drawing. Application October 28, 1955,
Serial No. 543,618

1 Claim. (Cl. 260—306.8)

The present invention is concerned with the triethylamine salt of N-(2-thiazoyl)-dithiocarbamic acid of the formula

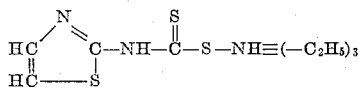

This compound is a crystalline solid which is somewhat soluble in many organic solvents and of low solubility in water. The new salt is useful as an intermediate for preparation of N-(2-thiazoyl)-isothiocyanate in excellent yield. The salt is also useful as parasiticide and adapted to be employed as an active toxic constituent of compositions for the control of insects, bacteria and fungi such as *Rhizoctonia solani* and *Fusarium spp.* For such use, the compound may be employed as a constituent of solvent solutions and aqueous dispersions or emulsions, or in mixture with inert finely divided powders.

The new compound may be prepared by reacting together (a) 2-aminothiazole, (b) carbon disulfide and (c) triethylamine. The reaction is conveniently carried out in an inert organic solvent in which the desired triethyl ammonium N-(2-thiazoyl)-dithiocarbamate is insoluble, and preferably in a low boiling solvent such as diethyl ether, diisopropyl ether or n-pentane. Good results are obtained when substantially equimolecular proportions of the reactants are employed. In a preferred operation, optimum yields are obtained when employing small excesses in the amount of ten percent each of the triethylamine and carbon disulfide reagents.

In the foregoing method, the triethylamine and 2-aminothiazole may be dispersed in the reaction solvent and the carbon disulfide added portionwise thereto. In an alternative procedure, the triethylamine, 2-aminothiazole and carbon disulfide are combined and blended together in the reaction solvent. The reaction takes place smoothly at temperatures of from 20° to 50° C. The temperature may be maintained by the addition of heat or by cooling as may be required. In a convenient method of operation, the reaction is carried out at the boiling temperature of the reaction mixture and under reflux. During the reaction, the desired product separates and solidifies in the reaction mixture as a crystalline solid. The latter may be separated by filtration and thereafter purified by conventional methods.

In a representative operation, 100.14 grams (1 mole) of 2-aminothiazole, 111.3 grams (1.1 moles) of triethylamine and 83.8 grams (1.1 moles) of carbon disulfide were dispersed in 0.5 liter of diethyl ether and the resulting mixture set aside at room temperature for several days to complete the reaction. During this period a triethyl ammonium N-(2-thiazoyl)-dithiocarbamate product separated and solidified in the mixture as a crystalline solid. The product was separated by filtration and found to melt with decomposition at 130° C. The product had sulfur and nitrogen contents of 35.13 and 14.92 percent, respectively, as compared to theoretical contents of 34.65 and 15.15 percent.

We claim:
The triethylamine salt of N-(2-thiazoyl)-dithiocarbamic acid.

No references cited.